(12) United States Patent
Kern et al.

(10) Patent No.: US 7,761,732 B2
(45) Date of Patent: Jul. 20, 2010

(54) DATA PROTECTION IN STORAGE SYSTEMS

(75) Inventors: Robert Frederic Kern, Otter Rock, OR (US); Kenneth Wayne Boyd, Tucson, AZ (US); William Frank Micka, Tucson, AZ (US); Gregory Edward McBride, Vail, AZ (US); John Thomas Flynn, Jr., Morgan Hill, CA (US); John Jay Wolfgang, Winston-Salem, NC (US); Michael E. Factor, Haifa (IL); Amiram Hayardeny, Binyamina (IL); Kenneth Fairclough Day, III, Tucson, AZ (US); Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 1074 days.

(21) Appl. No.: 11/297,126

(22) Filed: Dec. 7, 2005

(65) Prior Publication Data
US 2007/0168707 A1    Jul. 19, 2007

(51) Int. Cl.
*G06F 11/00* (2006.01)
(52) U.S. Cl. .......................................... 714/6
(58) Field of Classification Search ............... 714/6
See application file for complete search history.

(56) References Cited

U.S. PATENT DOCUMENTS

| | | | |
|---|---|---|---|
| 4,494,226 A | 1/1985 | Hazel et al. | |
| 5,278,982 A | 1/1994 | Daniels et al. | |
| 5,280,611 A | 1/1994 | Mohan et al. | |
| 5,333,303 A | 7/1994 | Mohan | |
| 5,832,203 A | 11/1998 | Putzolu et al. | |
| 6,151,607 A | 11/2000 | Lomet | |
| 6,216,178 B1 | 4/2001 | Stracovsky et al. | |
| 6,701,456 B1 | 3/2004 | Biessener | |
| 6,799,258 B1 | 9/2004 | Linde | |
| 7,036,044 B1* | 4/2006 | Verma et al. | 714/19 |
| 2002/0199054 A1* | 12/2002 | Akahane et al. | 711/103 |

(Continued)

FOREIGN PATENT DOCUMENTS

EP     0 465 018 A2    11/1991

(Continued)

OTHER PUBLICATIONS

"AMD Athlon Processor Performance-Enhancing Cache", Jun. 19, 2000, Advanced Micro Devices, Inc. pp. 2-8.*

(Continued)

*Primary Examiner*—Scott T Baderman
*Assistant Examiner*—Jigar Patel
(74) *Attorney, Agent, or Firm*—Rabindranath Dutta; Konrad Raynes & Victor LLP (57) ABSTRACT

Provided are a method, system, and article of manufacture wherein a command is received for writing data to a first storage location. A determination is made that previously written data is stored in the first storage location. The previously written data is copied to a second storage location, in response to determining that the previously written data is stored in the first storage location. The data is written to the first storage location, in response to copying the previously written data to the second storage location.

16 Claims, 6 Drawing Sheets

U.S. PATENT DOCUMENTS

2004/0054643 A1 3/2004 Vemuri et al.
2007/0028067 A1* 2/2007 Hinrichs et al. ............. 711/164

FOREIGN PATENT DOCUMENTS

| EP | 0 465 018 A3 | 11/1991 |
| EP | 0 465 018 B1 | 11/1991 |
| EP | 0827079 | 3/1998 |
| WO | WO02/33551 A1 | 4/2002 |

OTHER PUBLICATIONS

D. Haderle et al. "Methods for Space Management in Transaction Systems Supporting Fine-Granularity Locking", IBM Technical Disclosure Bulletin, vol. 36 publication No. 10, Oct. 1993, pp. 355-358 (5 pages submitted).

PCT International Search Report dated Apr. 29, 2008 for Application No. PCT/EP2006/068570 filed Nov. 16, 2006.

Amendment dated Jun. 2, 2009 in response to Communication Pursuant to Article 94(3) EPC dated Dec. 4, 2008 for Application No. 06 819 547.8-1225.

Communication Pursuant to Article 94(3) EPC dated Dec. 4, 2008 for Application No. 06 819 547.8-1225.

* cited by examiner

DATA PROTECTION IN STORAGE SYSTEMS

BACKGROUND

1. Field

The disclosure relates to a method, system, and article of manufacture for the protection of data in storage systems.

2. Background

Certain storage environments may store backup data in one or more secondary storage systems. If data is lost in a primary storage system, the backup data stored in the one or more secondary storage system may be used to recover the lost data. In certain storage environments, the primary storage system may be present in a primary storage site and the secondary storage system may be present in a secondary storage site. The primary and, secondary storage systems may also be referred to as storage systems or storage subsystems.

For example, a storage subsystem, such as the IBM* Enterprise Storage Server* (ESS), may provide a plurality of Redundant Array of Independent Disk (RAID) levels to ensure that availability of data is maintained even if a hard disk is damaged, and users can continue to use the storage subsystem. Furthermore, a plurality of clusters within an ESS may increase the availability of data in comparison to an ESS with a single cluster. Additionally, functions such as Flash-Copy*, IBM's Metro Mirror and Global Mirror, etc., can provide increased availability of data. For example, Flash-copy can provide a point in time backup copy of data, such that even when an entire RAID rank is lost, the backup copy of the data generated by FlashCopy can be used to recover from the lost RAID rank. The above techniques may address storage resilience aspects of a storage environment.

*IBM, Enterprise Storage Server, FlashCopy are trademarks or registered trademarks of IBM Corporation.

Data resident in a storage system may rely on point in time backups that may be used for recovering from a data loss. A point in time backup may have a specific time or other unique sequential entity associated with the point in time backup. For example, in certain storage systems point in time backups of data stored on a primary storage system may be made to tape storage at periodic intervals. In certain other storage systems, point in time backups may be made in real time via FlashCopy operations.

Corruption of data in storage systems may be caused by viruses, faulty input of data, execution of incorrect transactions, etc. When data is corrupted, certain storage systems may first be restored to the last point in time backup of the data before the data was corrupted. Subsequently, an attempt may be made to recreate all updates except for the update that caused the corruption, since the last point in time backup.

SUMMARY OF THE DESCRIBED EMBODIMENTS

Provided are a method, system, and article of manufacture wherein a command is received for writing data to a first storage location. A determination is made that previously written data is stored in the first storage location. The previously written data is copied to a second storage location, in response to determining that the previously written data is stored in the first storage location. The data is written to the first storage location, in response to copying the previously written data to the second storage location.

In certain additional embodiments, a determination is made as to whether the data written to the first storage location is to be overwritten with the previously written data. The previously written data stored in the second storage location is copied to the first storage location to overwrite the data written to the first storage location, in response to determining that the data written to the first storage location is to be overwritten with the previously written data.

In further embodiments, the command is received by a storage control unit from a host, wherein the determining, the copying and the writing are performed by the storage control unit, and wherein the command includes an identifier that indicates that any previously written data to the first storage location is to be copied for potential retrieval before the data is written to the first storage location.

In additional embodiments, the first and the second storage locations are coupled to the storage control unit. The storage control unit determines the second storage location to which the previously written data is copied, in response to the second storage location not being indicated in the command received from the host.

In further embodiments, the command is a single command that is received by a storage control unit from a host, and wherein the single command causes the determining, the copying, and the writing to be performed by the storage control unit.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made. For example, while the following description describes embodiments with reference to a backup of data, it is understood that alternative embodiments may be utilized for archiving of data, migration of data, etc.

Data Protection Via Undo Logs

In certain remote data replication solutions, an "undo log" may be maintained such that a data replication solution is capable of undoing some of the updates made to a secondary site. In case of data corruption occurring at the primary site, the "undo log" may be used to recover from the data corruption. Through use of the undo log, certain embodiments allow the secondary site to revert to a point in time before the occurrence of the corruption, thus providing consistent, non-corrupted data, although the provided data may be data that was present before the occurrence of the corruption.

An undo log may be created via the use of a "read before write" technique. In the read before write technique, for every data update that arrives at the secondary site, the current version of data in the location to be overwritten in first read and written to the undo log. If the data replication solution is to be used to revert to the data stored on the secondary site to a previous version, the data replication solution uses the undo log to retrieve the data stored in the previous version, and then reverts the data stored on the secondary site to the previous version.

In certain systems, an application that creates the undo log may have to perform three distinct Input/Output (I/O) operations for every updated block of data that arrives at the secondary site. The three distinct I/O operations may have to be performed sequentially and synchronously to ensure that valid data is stored in both the storage of the secondary site and in the undo log. The sequence of three distinct I/O operations may be as follows: (a) read the old data from the secondary storage target to which newly arrived data is to be written; (b) write the old data to the undo log; (c) write the newly arrived data to the secondary storage target. Certain embodiments allow the creation of a storage controller command that combines the three distinct I/O operations into a single command. The single command ensures that the read before write is an atomic operation that when executed runs to completion, thus eliminating any other updates interrupting the read before write. In certain additional embodiments, the Small Computer Systems Interface (SCSI) write commands may be extended with the single command provided by the embodiments.

Data Protection in Storage Systems

Figure 1:
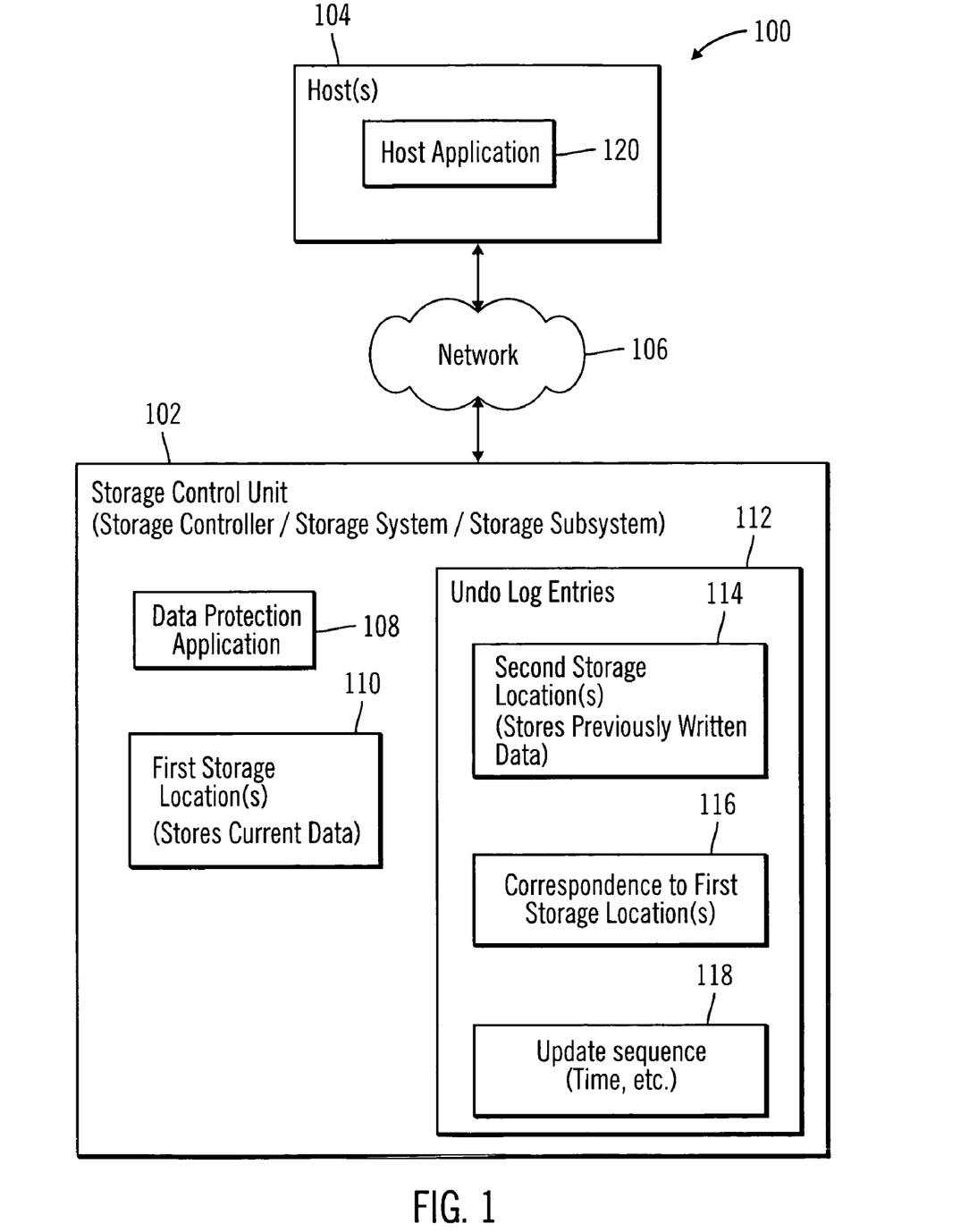
FIG. 1 illustrates a block diagram of a computing environment in accordance with certain embodiments.

FIG. 1 illustrates a block diagram of a computing environment 100 in accordance with certain embodiments. At least one storage control unit 102 is coupled to one or more hosts 104 over a network 106. The storage control unit 102 may comprise a storage controller, a storage system, a storage subsystem, etc., where the storage controlled by the storage control unit 102 may be stored in one or more storage devices. In certain embodiments the storage subsystem that comprises the storage control unit 102 may include one or more enterprise storage servers. In certain other embodiments, the storage control unit 102 may be a secondary storage subsystem that stores backup data. In certain additional embodiments, the storage control unit 102 may be coupled to other storage control units.

The hosts 104 may include any suitable computational platform, including those presently known in the art, such as personal computers, workstations, mainframes, midrange computers, network appliances, laptop computers, telephony devices, blade computers, hand held computers, etc. The hosts are capable of sending commands to the storage control unit 102 over the network 106.

The coupling of the storage control unit 102 to the hosts may be direct or may be via any network 106 known in the art, such as a Storage Area Network (SAN), Local Area Network (LAN), Wide Area Network (WAN), the Internet, an Intranet, etc.

The storage control unit 102 may be coupled to a data protection application 108, one or more first storage locations 110, and undo log entries 112. The data protection application 108 allows an atomic read before write to be performed by a command received from the host 104, where the received command is for storing data to the first storage locations 110 coupled to the storage control unit 102. The first storage location 110 stores current data, i.e., data stored at the current point in time. If the current data stored in the first storage location 110 is corrupted or otherwise needs to be restored to a previous point in time, then the undo log entries 112 are used by the data protection application 108 to restore the first storage location 110 to the previous point in time.

The undo log entries 112 may be implemented via any suitable data structures, such as a database entries, pointers, lists, arrays, etc. The undo log entries 112 are coupled to one or more second storage locations 114 that store the data previously written to the first storage locations 110. The undo log entries 112 store correspondences 116 of the data stored in the second storage locations 114 to the data stored in the first storage locations 110. For example, correspondences 116 may include the information that data stored at time T1 in address A1 of the first storage locations 110 has been saved in address A2 of the second storage locations 114. The undo log entries 112 also include the information related to the update sequence 118 of atomic read before write operations performed by the data protection application. For example, the update sequence 118 may indicate that five atomic read before write operations were performed at times T1, T2, T3, T4, and T5. The update sequence 118 may also store pointers to associated second storage locations 114 where the previously written data was stored for potential restoral. Alternative embodiments may employ different elements to implement the undo log entries 112.

In certain embodiments, the host 104 may include a host application 120 that sends a command to the storage control unit 102, where the command may request the storage control unit 102 to perform an atomic read before write operation. The data protection application 108 on the storage control unit 102 may interpret the command received from the host application 120 to execute an atomic read before write operation by storing previously written data to the undo log entries 112 before overwriting the data stored in the first storage locations 110, and then indicating to the host application 120 that the command has been successfully executed.

Figure 2:
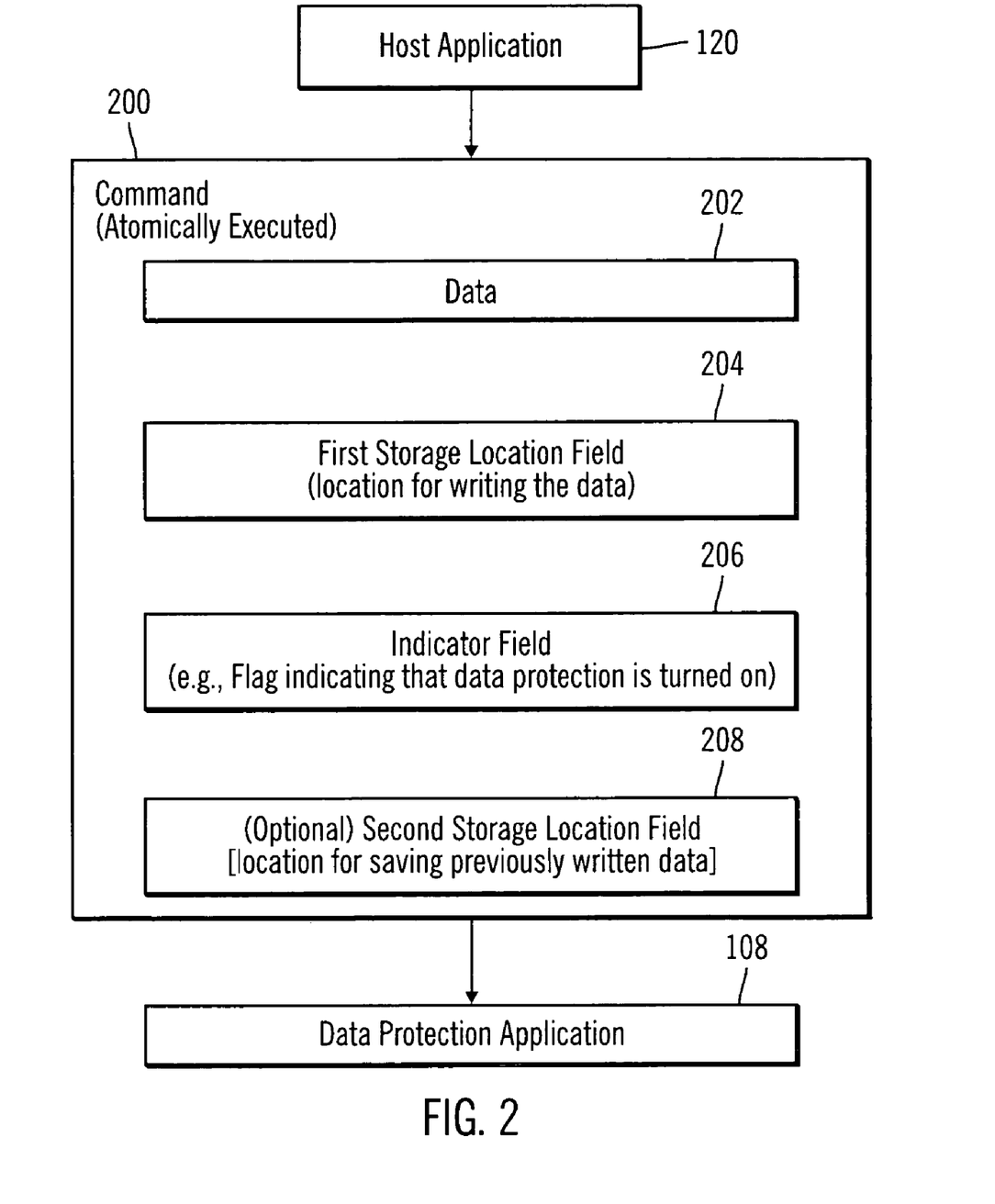
FIG. 2 illustrates a block diagram of a command sent by a host application to a data protection application, in accordance with certain embodiments.

FIG. 2 illustrates a block diagram of a command 200 sent by a host application 120 to a data protection application 108, in accordance with certain embodiments.

The command 200 may include data 202, a first storage location field 204, an indicator 206, and optionally a second storage location field 208. The host application 120 requests the data protection application 108 to write the data 202 to the first storage location 110, where the first storage location 110 is indicated by the first storage location field 204 in the command 200.

The indicator field 206 may comprise a flag that indicates whether read before write data protection is to be turned on. In certain embodiments, if the indicator field 206 is set to indicate that read before write is turned on, then the data protection application 108 will perform read before write while executing the command 200.

In certain embodiments, the command 200 may also include a second data storage location field 208 that indicates the second storage location 114 where data overwritten on the first storage location 110 is to be backed up by the data protection application 108 for potential retrieval in the future.

Therefore, FIG. 2 illustrates certain embodiments in which a single command 200 generated by the host application 120 causes the data protection application 108 to perform an atomic read before write operation in the storage control unit 102. The read before write operation is atomic because unless the read before write operation is successful the data protection application 108 does not communicate to the host application 120 that the single command 200 has been successfully completed. The single command 200 is an atomic operation that once executed runs to completion, thus eliminating any other update scenario interrupting the execution of the single command 200.

Figure 3:
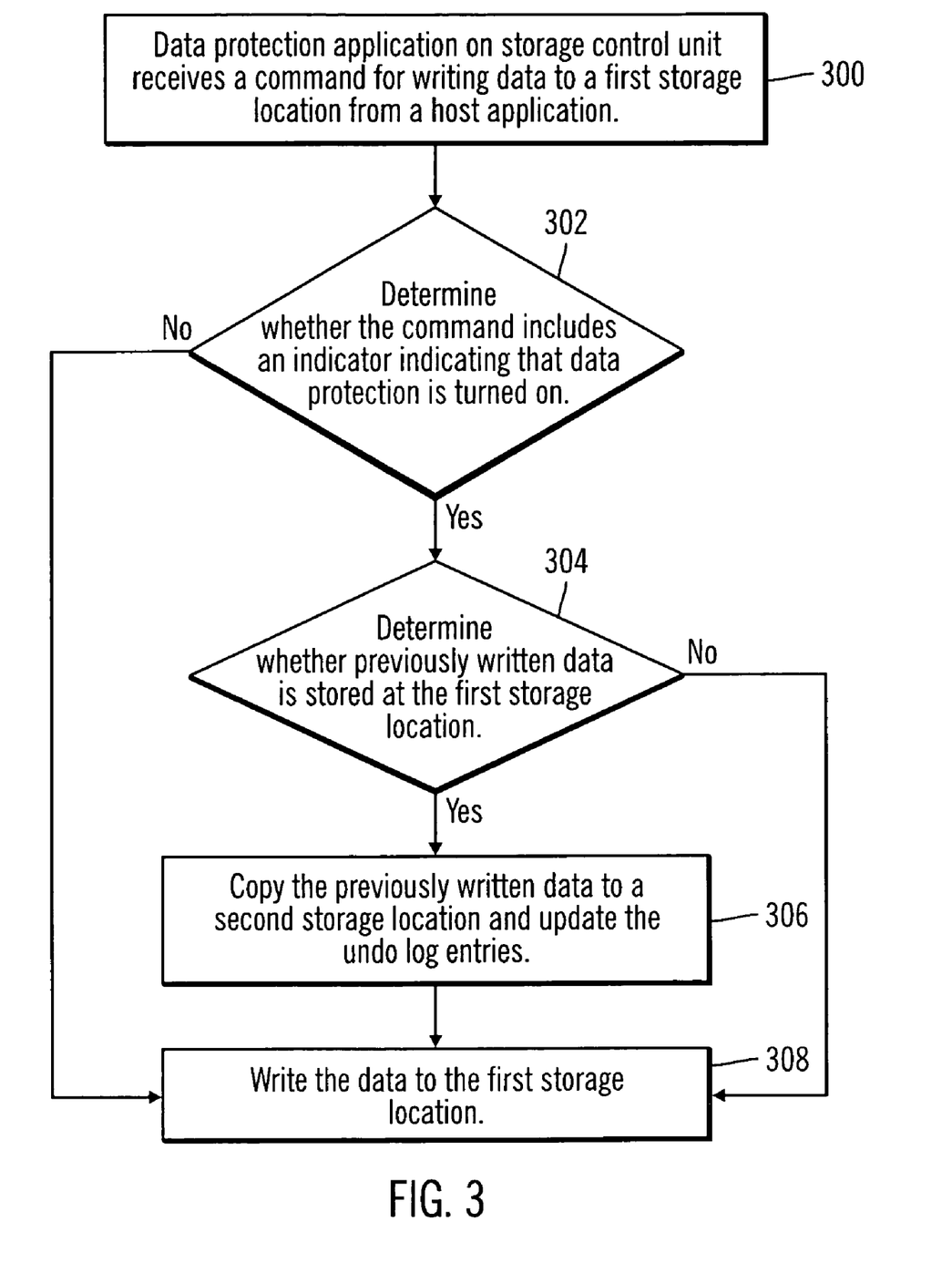
FIG. 3 illustrates a first flowchart that shows operations for processing a command received by a data protection application, in accordance with certain embodiments.

FIG. 3 illustrates a first flowchart that shows operations for processing the command 200 received by the data protection application 108, in accordance with certain embodiments. The operations illustrated in FIG. 3 may be implemented in the data protection application 108 that is coupled to the storage control unit 102.

Control starts at block 300, where the data protection application 108 on the storage control unit 102 receives a single command 200 for writing data to a first storage location 110 from a host application 120, where the first storage location 110 is indicated by the first storage location field 204 included in the single command 200.

The data protection application 108 determines (at block 302) whether the command 200 includes an indicator field 206 that indicates whether or not read before write data protection is turned on. If the data protection application 108 determines from the indicator field 206 that read before write data protection is turned on, then the data protection application 108 determines (at block 304) whether previously written data is stored at the first storage location 110. If so, the data protection application 108 copies (at block 306) the previously written data to a second storage location 114, where the second storage location 114 may optionally be indicated in the second storage location field 208 of the command 200. In certain embodiments, in which the second storage location 114 is not indicated in the second storage location field 208, the data protection application 108 may generate the address of the second storage location 114. The data protection application 108 also updates the undo log entries 112, such that the undo log entries 112 may be used to revert back to the data stored in the first storage location 110 at the time the command 200 was received, should the need arise. Subsequently, the data protection application 108 writes (at block 308) the data 202 to the first storage location 110 and sends a response indicating successful completion of the command 200 to the host application 120.

If at block 302, the data protection application 108 determines from the indicator field 204 that read before write data protection is not turned on, then the data protection application 108 writes (at block 308) the data 202 to the first storage location 110. In such a case, no read before write is performed by the data protection application 108 and the undo log entries 112 may not be updated.

If the data protection application 108 determines (at block 304) that no previously written data is stored at the first storage location 110 indicated by the first storage location field 204, then the data 202 is written (at block 308) to the first storage location 110. Since no data is being overwritten in the first storage location 110 there is no data to be saved in the undo log entries 112.

Therefore, FIG. 3 illustrates certain embodiments in which a data protection application 108 receives a single command 200 that may request an atomic read before write to be performed. The data protection application 108 may store data to be overwritten in the storage control unit 102 in the undo log entries 112, before writing the data to the storage control unit 102.

Figure 4:
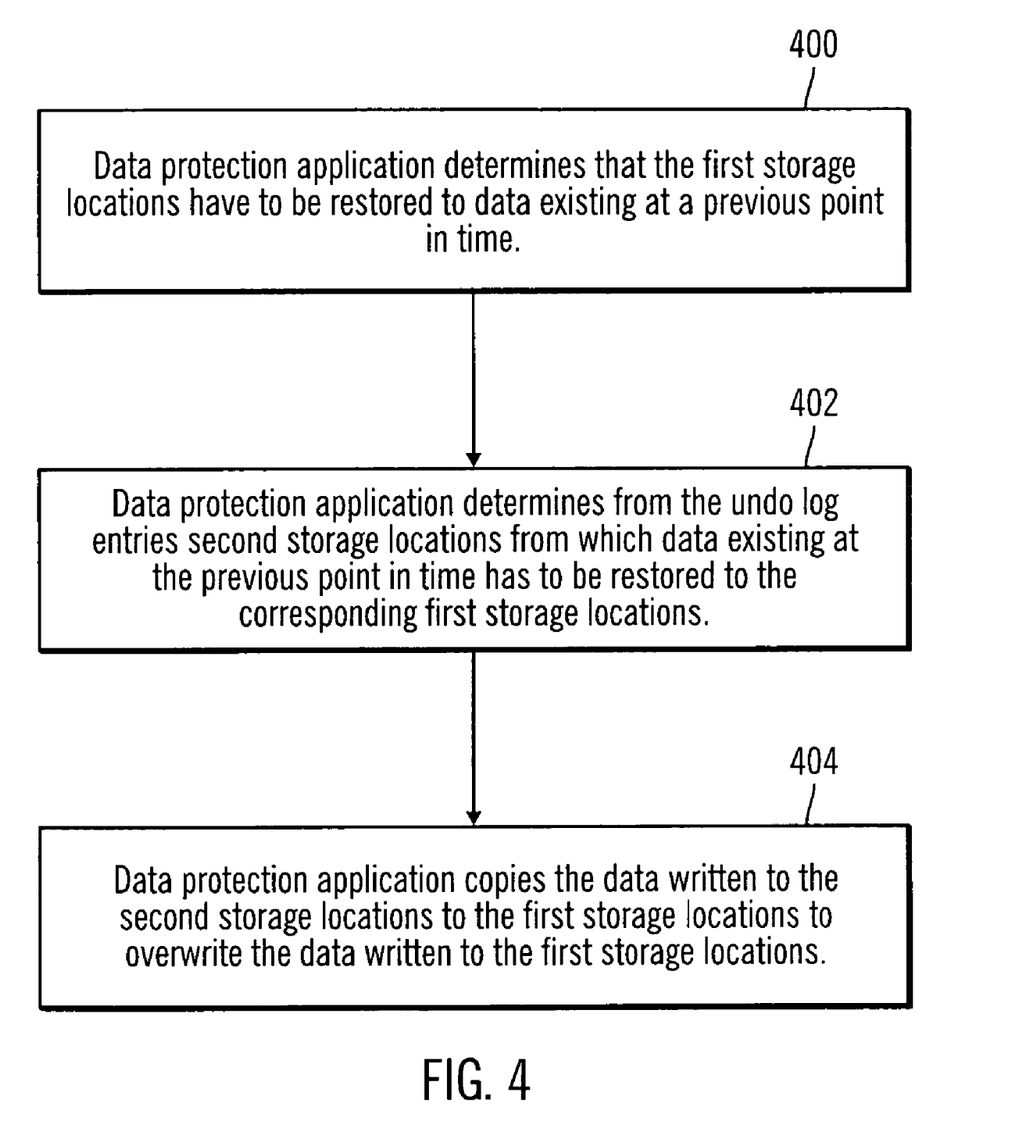
FIG. 4 illustrates a second flowchart that shows how storage locations are restored with data existing at a previous point in time, in accordance with certain embodiments.

FIG. 4 illustrates a second flowchart that shows how storage locations, such as first storage locations 110, are restored with data existing at an immediately previous point in time, in accordance with certain embodiments. The operations illustrated in FIG. 4 may be implemented in the data protection application 108 that is coupled to the storage control unit 102.

Control starts at block 400, where the data protection application 108 determines that the first storage locations 110 have to be restored to data existing at a previous point in time. For example, in certain embodiments data written to the first storage locations 110 may have been corrupted because of a virus or because of an incorrect database transaction. However, a storage administrator may want to restore a storage control unit 102 to store data existing at a previous point in time for any reason and not just because of data corruption.

The data protection application 108 determines (at block 402), from the undo log entries 112, those second storage locations 114 from which data existing at the immediately previous point in time may be restored to the corresponding first storage locations 110. The determination may be performed by using the correspondences 116 of the second storage locations 112 to the first storage locations 110 and the update sequence 118. For example, if the current point in time is represented by T3, and the immediately previous point in time is represented as T2, then the data protection application 108 may determine selected second storage locations 114 in which data has been stored at time T2, where the data was stored at the selected second storage locations 114 to save data that was overwritten to the first storage locations 110 at time T2.

Control proceeds to block 404, where the data protection application 108 copies the data written to the second storage locations 114 to the first storage locations 110 to overwrite the data written to the first storage locations 110. In certain embodiments, while overwriting data and restoring to previous points in time, a read before write process may be performed as data is overwritten with previous data. In such embodiments, when data has been restored to a previous point in time, the process may be reversed and the data may be taken back to the most up to date version of the data. For example, such embodiments may be implemented when data is being restored to get back a deleted file and is not being restored because of a data corruption. In such embodiments, a reversion is made to the state before the file was deleted, then the file is copied to some other location, and then an update is made with the most up to date version of the data so that no data is lost.

In alternative embodiments, a storage administrator may determine that data has to be reverted back to a point in time represented by T1, where three atomic read before write operations have been performed at times T1, T2, T3 successively. In such a case, the data protection application 108 may first restore the first storage locations 110 to data existing at time T3, then restore the first storage locations 110 to data existing at time T2, and finally restore the first storage locations 110 to data existing at time T1. In certain embodiments, each point in time, T1, T2, T3 may correspond to a single update, i.e., the embodiments may be implemented to a granularity of single updates. In certain embodiments, when restoring data from one location to another, the restoration is performed in the proper order so as to maintain data consistency.

Therefore, FIG. 4 illustrates certain embodiments in which the undo log entries 112 are used to restore first storage locations 110 to data stored at a previous point in time.

Figure 5:
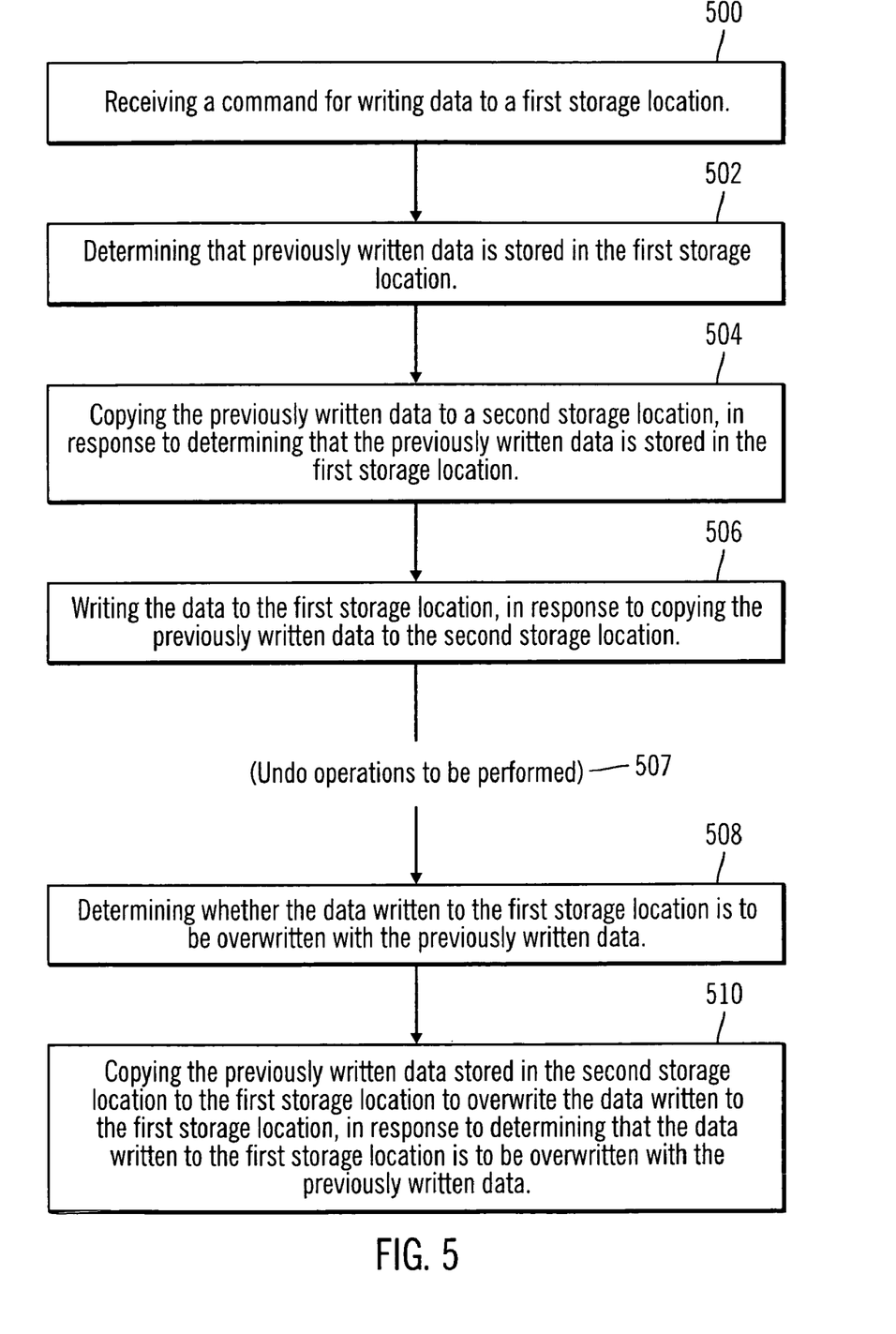
FIG. 5 illustrates a third flowchart that shows how data is protected in a storage system, in accordance with certain embodiments.

FIG. 5 illustrates a third flowchart that shows how data is protected in a storage system, such as the storage control unit 102, in accordance with certain embodiments. The operations illustrated in FIG. 5 may be implemented in the data protection application 108 that is coupled to the storage control unit 102.

Control starts at block 500 where the data protection application 108 receives a command 200 for writing data to a first storage location 110. In certain embodiments, the command 200 is a single command. The data protection application 108 determines (at block 502) that previously written data is stored in the first storage location 110. The data protection application 108 copies (at block 504) the previously written data to a second storage location 114, in response to determining that the previously written data is stored in the first storage location 110. The data protection application 108 writes (at block 506) the data to the first storage location 110, in response to copying the previously written data to the second storage location 114. In certain embodiments the single command 200 is an atomic operation that causes the determining, the copying, and the writing to be performed by the storage control unit 102.

At a later point in time, undo operations may have to be performed (reference numeral 507) to revert the first storage locations 110 to data stored at a previous point in time. The data protection application 108 determines (at block 508) whether the data written to the first storage location 110 is to be overwritten with the previously written data. The data protection application copies (at block 510) the previously written data stored in the second storage location 114 to the first storage location 110 to overwrite the data written to the first storage location 110, in response to determining that the data written to the first storage location 110 is to be overwritten with the previously written data. A sequence of undo operations may be performed in certain embodiments to restore the first storage locations 110 to an earlier point in time.

Certain embodiments define a single command 200 that is sent a storage control unit 102. The single command 200 includes the information currently included in write commands, including the address of the data location to be updated and the data itself. The single command 200 may also include information denoting where the old version of the data is to be written before the updated data overwrites the old version.

The storage control unit 102 executes all operations for executing the single command 200 before returning control to the host 104. The storage control unit 102 is responsible for ensuring that the current version of data stored in the location to be overwritten is written to the second storage location 114, and that the new data included in the single command 200 is written to the first storage location 110. In certain embodiments, the storage control unit 102 either completes the writes to the disks or hardens the data in the cache and nonvolatile storage in order to guarantee to the hosts 104 that neither the old nor the current version of the data will be lost in case of a failure.

By encapsulating the read before write operations into a single command 200, a host application 120 can control on an I/O by I/O basis which data will be included in the undo log entries 112, as opposed to requiring the storage control unit 102 to include every update for every volume.

Certain embodiments, allow recovery of a volume, logical unit numbers (LUN), data base table entry, data set, file system entry, etc., to a point in time while permitting access in real time to the rest of the data base, file system data set, etc. Certain embodiments also allow a storage system to recover from logical error and may allow correction of errors to a specific level of granularity. The granularity may be on one or more volumes, LUNs, files, data sets, etc.

While certain embodiments have been described with respect to point in time updates, alternative embodiments may be implemented on the basis of relative times or sequence numbers that identify data updates. Furthermore, implementing the execution of the single command 200 in the storage control unit 202 may improve the performance of read before write systems by allowing the storage control unit 200 to make use of the internal cache of the storage control unit 200 for staging old and new data instead of returning data to the host application 120.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 6:
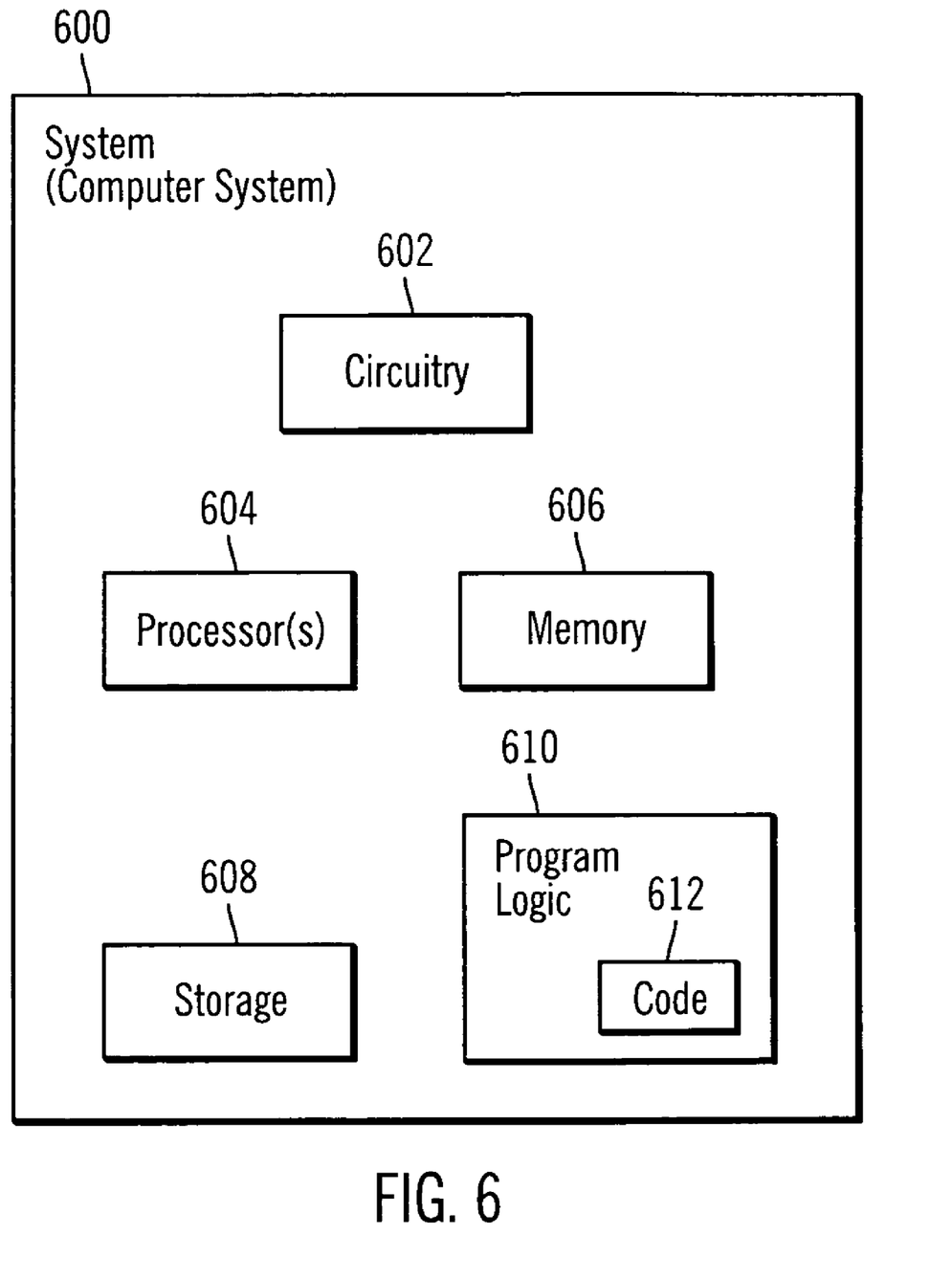
FIG. 6 illustrates the architecture of a computer system, wherein in certain embodiments the hosts and the storage control unit of the computing environment of FIG. 1 may be implemented in accordance with the architecture of the computer system.

FIG. 6 illustrates the architecture of a computer system 600, wherein in certain embodiments the storage control unit 102 and the hosts 104 of the computing environment 100 of FIG. 1 may be implemented in accordance with the architecture of the computer system 600. The system 600 may include a circuitry 602 that may in certain embodiments include a processor 604. The system 600 may also include a memory 606 (e.g., a volatile memory device), and storage 608. Certain elements of the system 600 may or may not be found in the storage control unit 102 and the hosts 104. The storage 608 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 608 may comprise an internal storage device, an attached storage device and/or a network accessible storage device. The system 600 may include a program logic 610 including code 612 that may be loaded into the memory 606 and executed by the processor 604 or circuitry 602. In certain embodiments, the program logic 610 including code 612 may be stored in the storage 608. In certain other embodiments, the program logic 610 may be implemented in the circuitry 602. Therefore, while FIG. 6 shows the program logic 610 separately from the other elements, the program logic 610 may be implemented in the memory 606 and/or the circuitry 602.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 3-5 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-6 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:
1. A method, comprising:
receiving, by a storage control unit from a host, a command for writing data to a first storage location, wherein the command includes an identifier;
determining, by the storage control unit, whether the identifier in the command received from the host indicates that data protection is turned on, wherein if data protection turned on then any previously written data to the first storage location is to be copied for potential retrieval before the data is written to the first storage location;
in response to determining, by the storage control unit, that the identifier in the command received from the host indicates that data protection is turned on, performing:
determining, by the storage control unit, that previously written data is stored in the first storage location;
copying, by the storage control unit, the previously written data to a second storage location, in response to determining that the previously written data is stored in the first storage location, wherein the first storage location and the second storage location are maintained in the storage control unit, and wherein the storage control unit includes data structures that include correspondences of selected data stored in the second storage location to the selected data stored in the first storage location at a selected time; and
writing, by the storage control unit, the data to the first storage location, in response to copying the previously written data to the second storage location; and in response to determining, by the storage control unit, that the identifier in the command received from the host indicates that data protection is not turned on, performing:

writing, by the storage control unit, the data to the first storage location.

2. The method of claim 1, further comprising:

determining whether the data written to the first storage location is to be overwritten with the previously written data; and copying the previously written data stored in the second storage location to the first storage location to overwrite the data written to the first storage location, in response to determining that the data written to the first storage location is to be overwritten with the previously written data.

3. The method of claim 1, wherein the first and the second storage locations are coupled to the storage control unit, the method further comprising:

determining, by the storage control unit, the second storage location to which the previously written data is copied, in response to the second storage location not being indicated in the command received from the host.

4. The method of claim 1, wherein the command is a single command, wherein the data structures comprise undo log entries, wherein the single command combines at least three distinct input/output (I/O) operations into the single command, and wherein by encapsulating read before write operations into the single command a host application in the host controls on an I/O by I/O basis which data is to be included in the undo log entries.

5. A method for deploying computing infrastructure, comprising integrating computer-readable code into a computing system, wherein the code in combination with the computing system is capable of performing:

receiving, by a storage control unit from a host, a command for writing data to a first storage location, wherein the command includes an identifier;

determining, by the storage control unit, whether the identifier in the command received from the host indicates that data protection is turned on, wherein if data protection turned on then any previously written data to the first storage location is to be copied for potential retrieval before the data is written to the first storage location;

in response to determining, by the storage control unit, that the identifier in the command received from the host indicates that data protection is turned on, performing:

determining, by the storage control unit, that previously written data is stored in the first storage location;

copying, by the storage control unit, the previously written data to a second storage location, in response to determining that the previously written data is stored in the first storage location, wherein the first storage location and the second storage location are maintained in the storage control unit, and wherein the storage control unit includes data structures that include correspondences of selected data stored in the second storage location to the selected data stored in the first storage location at a selected time; and writing, by the storage control unit, the data to the first storage location, in response to copying the previously written data to the second storage location; and in response to determining, by the storage control unit, that the identifier in the command received from the host indicates that data protection is not turned on, performing:

writing, by the storage control unit, the data to the first storage location.

6. The method of claim 5, wherein the code in combination with the computing system is further capable of performing:

determining whether the data written to the first storage location is to be overwritten with the previously written data; and copying the previously written data stored in the second storage location to the first storage location to overwrite the data written to the first storage location, in response to determining that the data written to the first storage location is to be overwritten with the previously written data.

7. The method of claim 5, wherein the first and the second storage locations are coupled to the storage control unit, wherein the code in combination with the computing system is further capable of performing:

determining, by the storage control unit, the second storage location to which the previously written data is copied, in response to the second storage location not being indicated in the command received from the host.

8. The method of claim 5, wherein the command is a single command, wherein the data structures comprise undo log entries, wherein the single command combines at least three distinct input/output (I/O) operations into the single command, and wherein by encapsulating read before write operations into the single command a host application in the host controls on an I/O by I/O basis which data is to be included in the undo log entries.

9. A storage control unit coupled to a host, the storage control unit comprising:

a memory;

a first storage location coupled to the memory;

a second storage location coupled to the memory; and a processor coupled to the memory, wherein the processor performs operations, the operations comprising:

receiving, by the storage control unit from the host, a command for writing data to a first storage location, wherein the command includes an identifier;

determining, by the storage control unit, whether the identifier in the command received from the host indicates that data protection is turned on, wherein if data protection turned on then any previously written data to the first storage location is to be copied for potential retrieval before the data is written to the first storage location;

in response to determining, by the storage control unit, that the identifier in the command received from the host indicates that data protection is turned on, performing:

determining, by the storage control unit, that previously written data is stored in the first storage location;

copying, by the storage control unit, the previously written data to a second storage location, in response to determining that the previously written data is stored in the first storage location, wherein the first storage location and the second storage location are maintained in the storage control unit, and wherein the storage control unit includes data structures that include correspondences of selected data stored in the second storage location to the selected data stored in the first storage location at a selected time; and writing, by the storage control unit, the data to the first storage location, in response to copying the previously written data to the second storage location; and in response to determining, by the storage control unit, that the identifier in the command received from the host indicates that data protection is not turned on, performing:

writing, by the storage control unit, the data to the first storage location.

10. The storage control unit of claim 9, the operations further comprising:

determining whether the data written to the first storage location is to be overwritten with the previously written data; and copying the previously written data stored in the second storage location to the first storage location to overwrite the data written to the first storage location, in response to determining that the data written to the first storage location is to be overwritten with the previously written data.

11. The storage control unit of claim 9, the operations further comprising:

determining, by the storage control unit, the second storage location to which the previously written data is copied, in response to the second storage location not being indicated in the command received from the host.

12. The storage control unit of claim 9, wherein the command is a single command, wherein the data structures comprise undo log entries, wherein the single command combines at least three distinct input/output (I/O) operations into the single command, and wherein by encapsulating read before write operations into the single command a host application in the host controls on an I/O by I/O basis which data is to be included in the undo log entries.

13. A computer readable storage medium, wherein code stored in the computer readable storage medium when executed by a processor causes operations, the operations comprising:

receiving, by a storage control unit from a host, a command for writing data to a first storage location, wherein the command includes an identifier;

determining, by the storage control unit, whether the identifier in the command received from the host indicates that data protection is turned on, wherein if data protection turned on then any previously written data to the first storage location is to be copied for potential retrieval before the data is written to the first storage location;

in response to determining, by the storage control unit, that the identifier in the command received from the host indicates that data protection is turned on, performing:

determining, by the storage control unit, that previously written data is stored in the first storage location;

copying, by the storage control unit, the previously written data to a second storage location, in response to determining that the previously written data is stored in the first storage location, wherein the first storage location and the second storage location are maintained in the storage control unit, and wherein the storage control unit includes data structures that include correspondences of selected data stored in the second storage location to the selected data stored in the first storage location at a selected time; and writing, by the storage control unit, the data to the first storage location, in response to copying the previously written data to the second storage location; and in response to determining, by the storage control unit, that the identifier in the command received from the host indicates that data protection is not turned on, performing:

writing, by the storage control unit, the data to the first storage location.

14. The computer readable storage medium of claim 13, the operations further comprising:

determining whether the data written to the first storage location is to be overwritten with the previously written data; and copying the previously written data stored in the second storage location to the first storage location to overwrite the data written to the first storage location, in response to determining that the data written to the first storage location is to be overwritten with the previously written data.

15. The computer readable storage medium of claim 13, wherein the first and the second storage locations are coupled to the storage control unit, the operations further comprising:

determining, by the storage control unit, the second storage location to which the previously written data is copied, in response to the second storage location not being indicated in the command received from the host.

16. The computer readable storage medium of claim 13, wherein the command is a single command, wherein the data structures comprise undo log entries, wherein the single command combines at least three distinct input/output (I/O) operations into the single command, and wherein by encapsulating read before write operations into the single command a host application in the host controls on an I/O by I/O basis which data is to be included in the undo log entries.

* * * * *